United States Patent
Lai et al.

(10) Patent No.: US 7,050,311 B2
(45) Date of Patent: May 23, 2006

(54) MULTILEVEL CONVERTER BASED INTELLIGENT UNIVERSAL TRANSFORMER

(75) Inventors: Jih-Sheng Lai, Blacksburg, VA (US); Arshad Mansoor, Oak Ridge, TN (US); Arindam Maitra, Knoxville, TN (US); Frank Goodman, Palo Alto, CA (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 50 days.

(21) Appl. No.: 10/723,621

(22) Filed: Nov. 25, 2003

(65) Prior Publication Data

US 2005/0111246 A1    May 26, 2005

(51) Int. Cl.
*H02M 5/45* (2006.01)
(52) U.S. Cl. ..................................................... 363/37
(58) Field of Classification Search ............... 363/17, 363/34, 37, 132; 307/82
See application file for complete search history.

(56) References Cited

U.S. PATENT DOCUMENTS

| | | |
|---|---|---|
| 4,768,141 A | 8/1988 | Hubertus et al. |
| 5,065,303 A | 11/1991 | Nguyen et al. |
| 5,138,544 A | 8/1992 | Jessee |
| 5,198,970 A * | 3/1993 | Kawabata et al. ............ 363/37 |
| 5,337,227 A | 8/1994 | Stacey et al. |
| 5,361,196 A | 11/1994 | Tanamachi et al. |
| 5,446,642 A | 8/1995 | McMurray |
| 5,446,643 A | 8/1995 | McMurray |
| 5,467,262 A | 11/1995 | Nakata et al. |
| 5,523,937 A | 6/1996 | Kähkipuro |
| 5,532,575 A | 7/1996 | Ainsworth et al. |
| 5,563,780 A | 10/1996 | Goad |
| 5,566,061 A | 10/1996 | Uchino |
| 5,587,891 A | 12/1996 | Nakata et al. |
| 5,621,628 A | 4/1997 | Miyazaki et al. |
| 5,642,275 A | 6/1997 | Peng et al. |
| 5,644,483 A | 7/1997 | Peng et al. |
| 5,694,307 A | 12/1997 | Murugan |
| 5,731,970 A | 3/1998 | Mori et al. |
| 5,742,493 A | 4/1998 | Ito et al. |
| 5,757,633 A | 5/1998 | Bowles ....................... 363/71 |
| 5,801,936 A | 9/1998 | Mori et al. |
| 5,805,437 A | 9/1998 | Grüning |
| 5,831,842 A | 11/1998 | Ogasawara et al. |
| 5,835,371 A | 11/1998 | Kume et al. |

(Continued)

FOREIGN PATENT DOCUMENTS

GB        2 294 821        8/1996

OTHER PUBLICATIONS

Aeloiza et al., "Next Generation Distribution Transformer: To address Power Quality for Critical Loads", vol. 2: Statistical Summary Report, May 1996.

(Continued)

*Primary Examiner*—Adolf Berhane
(74) *Attorney, Agent, or Firm*—Morgan, Lewis & Bockius LLP

(57) ABSTRACT

A multilevel converter-based, intelligent, universal transformer includes back-to-back, interconnected, multi-level converters coupled to a switched inverter circuit via a high-frequency transformer. The input of the universal transformer can be coupled to a high-voltage distribution system and the output of the universal transformer can be coupled to low-voltage applications. The universal transformer is smaller in size than conventional copper-and-iron based transformers, yet provides enhanced power quality performance and increased functionality.

16 Claims, 11 Drawing Sheets

U.S. PATENT DOCUMENTS

| | | | |
|---|---|---|---|
| 5,841,645 A | 11/1998 | Sato | |
| 5,889,662 A | 3/1999 | Schettler et al. | |
| 5,889,668 A | 3/1999 | Schauder et al. | |
| 5,933,339 A | 8/1999 | Duba et al. | |
| 5,940,285 A | 8/1999 | Carrere et al. | |
| 5,943,229 A | 8/1999 | Sudhoff | |
| 5,949,664 A | 9/1999 | Bernet et al. | |
| 5,969,959 A | 10/1999 | Odegard et al. | |
| 5,995,391 A | 11/1999 | Davies et al. | |
| 6,005,362 A | 12/1999 | Enjeti et al. | |
| 6,005,788 A | 12/1999 | Lipo et al. | |
| 6,009,002 A | 12/1999 | Steimer | |
| 6,031,738 A | 2/2000 | Lipo et al. | |
| 6,040,990 A | 3/2000 | Courault | |
| 6,058,031 A | 5/2000 | Lyons et al. | |
| 6,108,223 A | 8/2000 | Julian et al. | |
| 6,118,676 A | 9/2000 | Divan et al. | |
| 6,144,567 A | 11/2000 | Asplund et al. | |
| 6,151,227 A | 11/2000 | Mizutani et al. | |
| 6,154,379 A | 11/2000 | Okita | |
| 6,169,672 B1 | 1/2001 | Kimura et al. | |
| 6,169,676 B1 | 1/2001 | Dähler | |
| 6,175,166 B1 | 1/2001 | Bapat | |
| 6,226,192 B1 | 5/2001 | Yamanaka et al. | |
| 6,229,722 B1 | 5/2001 | Ichikawa et al. | |
| 6,236,580 B1 | 5/2001 | Aiello et al. | |
| 6,288,915 B1 | 9/2001 | Stemmier et al. | |
| 6,301,130 B1 | 10/2001 | Aiello et al. | |
| 6,307,760 B1 | 10/2001 | Ikimi | |
| 6,310,787 B1 | 10/2001 | Ito et al. | |
| 6,353,547 B1 | 3/2002 | Jang et al. | |
| 6,404,655 B1 | 6/2002 | Welches | |
| 6,411,530 B1 | 6/2002 | Hammond et al. | |
| 6,459,596 B1 | 10/2002 | Corzine | |
| 6,480,403 B1 | 11/2002 | Bijlenga | |
| 6,490,182 B1 | 12/2002 | Katoh et al. | |
| 6,507,503 B1 | 1/2003 | Norrga | |
| 6,510,063 B1 | 1/2003 | Kobayashi et al. | |
| 6,594,162 B1 | 7/2003 | Shinoda et al. | |
| 6,597,590 B1 | 7/2003 | Ikimi et al. | |
| 6,603,672 B1 | 8/2003 | Deng et al. | |
| 2001/0026460 A1 | 10/2001 | Ito et al. | |
| 2001/0038541 A1 | 11/2001 | Hammon et al. | |
| 2002/0167825 A1 | 11/2002 | Okayama et al. | |
| 2003/0043603 A1 | 3/2003 | Schreiber | |
| 2003/0156437 A1 | 8/2003 | Gruening | |

OTHER PUBLICATIONS

Tolbert et al., "A Multilevel Converter-Based Universal Power Conditioner", PESC'99 Jun. 27-Jul. 1, pp. 393-399.

Schibili et al., "A Three-Phase Multilevel Converter for High-Power Induction Motors", 1998 IEEE vol. 13, No. 5, Sep. 1998 pp. 978-986.

Manjrekar et al., "Hybrid Multilevel Power Conversion System: a competitive solution for high power applications", Department of Electrical and Computer Engineering, 1999.

Chiasson et al., "Harmonic Elimination in Multilevel Converters", ECE Dept. The University of Tennessee, pp. 1-6.

Tolbert et al., "Multilevel Converters for Large Electric Drives", APEC 1998, Feb. 15-19, 1998, pp. 530-536.

Tolbert et al., "Multilevel Converters as a Utility Interface for Renewable Energy Systems".

F. Goodman, "Feasibility Assessment for Intelligent Universal Transformer", Technology Assessment for Hybrid Designs, Final Report, Dec. 2002, Chapter 5, pp. 5-1-5-41.

\* cited by examiner

MULTILEVEL CONVERTER BASED INTELLIGENT UNIVERSAL TRANSFORMER

TECHNICAL FIELD

The present invention relates generally to power conversion technology, and in particular to a multi-level converter based "all-solid-state" (electronic) universal transformer for power distribution systems.

BACKGROUND

Given the growing environmental, economic, and governmental concerns for building new power generation facilities, utilities continue to look for cost-effective ways to defer new power generation while meeting their customers' growing demand for electricity. In this environment, power producers need to mix and match their electrical services offering to meet the customers' changing requirements. While some major improvements (such as the introduction of grain-oriented core steel) have occurred in transformer technology from time to time, other developments in the areas of core, winding, insulation, and dielectric liquids have provided only incremental improvements in transformer technology. Thus, there is a continuing need for sophisticated transformer devices that can employ modern power electronics to improve transformer functionality.

There are two possible approaches for realizing such sophisticated devices with modern power electronics: the "hybrid" design and the "all-solid-state" design. The "hybrid" design is based on the integration of a conventional transformer with power electronics only on the secondary side of the transformer. The "all-solid-state" design, on the other hand, provides a fundamentally different and more complete approach in transformer design by using power electronics on the primary and secondary sides of the transformer. The power electronics on the primary side of the transformer provide a high voltage interface with the utility Alternating Current (AC) system and the power electronics on the secondary side of the transformer provide a low voltage interface with consumer applications.

All-solid-state (electronic) transformer technology can provide control over the shape and amplitude of output voltage waveforms and can, therefore, address many power quality problems. Electronic transformer designs can solve some shortcomings found in conventional transformer technology, such as voltage drop under increasing load, "flat topped" voltage under saturation, harmonic sensitivity, containment requirements for oil spill, limited performance under Direct Current (DC) offset load unbalances, providing options for high-frequency AC, ability to convert single-phase service to three-phase for powering certain types of equipment, provide reactive compensation and so forth. In addition, this technology has the potential to lend itself to standardization of distribution transformers and to achieving other operational benefits like reduced weight and size, and reduced environmental concerns (e.g., by eliminating oil in the transformer, etc.).

One problem associated with all-solid-state transformers is the inability to provide isolation between the primary and secondary sides of the transformer. To convert two different voltage levels, it is often desirable to have transformer isolation to fully use the semiconductor switches in the transformer. One proposed solution is to modulate the input AC waveform by a power electronic converter to a high frequency square wave, which is then passed through a small, high-frequency transformer.

Several designs for solid-state power converters having high-frequency AC transformers have been proposed in the past. Some of those proposed structures can be used as building blocks for larger system structures. For example, a system structure can include multiple solid-state building blocks or modules having their inputs connected in series and their outputs connected in parallel. While such designs have some advantages (e.g., harmonic elimination, transformer isolation, reduction in size of magnetic materials, etc.), there are several drawbacks as well. For example, a problem inherent in such designs is the difficulty of ensuring that the input voltages balance among the different modules in the system structure. With device mismatching and without any active control, the input voltages among the different modules are unlikely to be maintained at the same voltage level. One solution may be to add a set of voltage balancing zener diodes, Metal Oxide Varistors (MOVs) or other passive voltage clamping methods. However, a typical passive voltage balancing element or clamping circuit consumes a large amount of power and is not practical in high-power applications.

Therefore, what is needed is multilevel converter-based intelligent, universal transformer that can interface directly to a power distribution system. The universal transformer should allow for the series connection of an unlimited number of modern power semiconductor devices while maintaining proper voltage balance.

SUMMARY

The deficiencies of conventional systems and methods are overcome by the present invention, which provides a multilevel converter-based, intelligent universal transformer. The universal transformer includes back-to-back, interconnected, multi-level converters coupled to a switched inverter circuit via a high-frequency transformer. The input of the universal transformer can be coupled to a high-voltage distribution system and the output of the universal transformer can be coupled to low-voltage applications.

An embodiment of the present invention includes a power conversion device. The power conversion device includes a multilevel converter (e.g., a diode-clamped, multilevel converter) configurable to convert an input waveform having a first frequency into a second waveform having a second frequency. The second frequency is higher than the first frequency. A transformer is coupled to the multilevel converter and configurable to transform the second waveform from a first voltage level to a second voltage level. The first voltage level is higher than the second voltage level. A switched inverter circuit is coupled to the transformer and configurable to convert the transformed, second waveform into a third output waveform for use with a power application.

In some embodiments, the power conversion device includes a filter circuit coupled to the switched inverter circuit for smoothing the third output waveform into a substantially clean, sinusoidal waveform.

The multilevel converter of the present invention can be implemented using several different embodiments. In some embodiments, the multilevel converter further includes a first set of switches configurable to provide a multilevel, full-bridge converter; and a second set of switches coupled to the first set of switches and configurable to provide a multilevel, full-bridge inverter. The second set of switches are also configurable to provide a multilevel, half-bridge inverter. The switches can be high-voltage Integrated Gate Bipolar Transistors (IGBTs) for directly coupling the multilevel converter to a distribution voltage level.

An advantage of the universal transformer is that it is smaller in size than conventional copper-and-iron based transformers, yet provides enhanced power quality performance and increased functionality. The reduced size is the result of using a high-frequency transformer, which uses less magnetic materials.

Another advantage of the universal transformer is the use of modern power electronics to provide additional functionality, including: (1) voltage sag and outage compensation, (2) instantaneous voltage regulation, (3) capacitor switching protection, (4) harmonic compensation, (5) single-phasing protection, (6) DC output, and (7) variable frequency output (e.g., 50 Hz, 60 Hz, 400 Hz, etc.).

DESCRIPTION OF EMBODIMENTS

Figure 1:
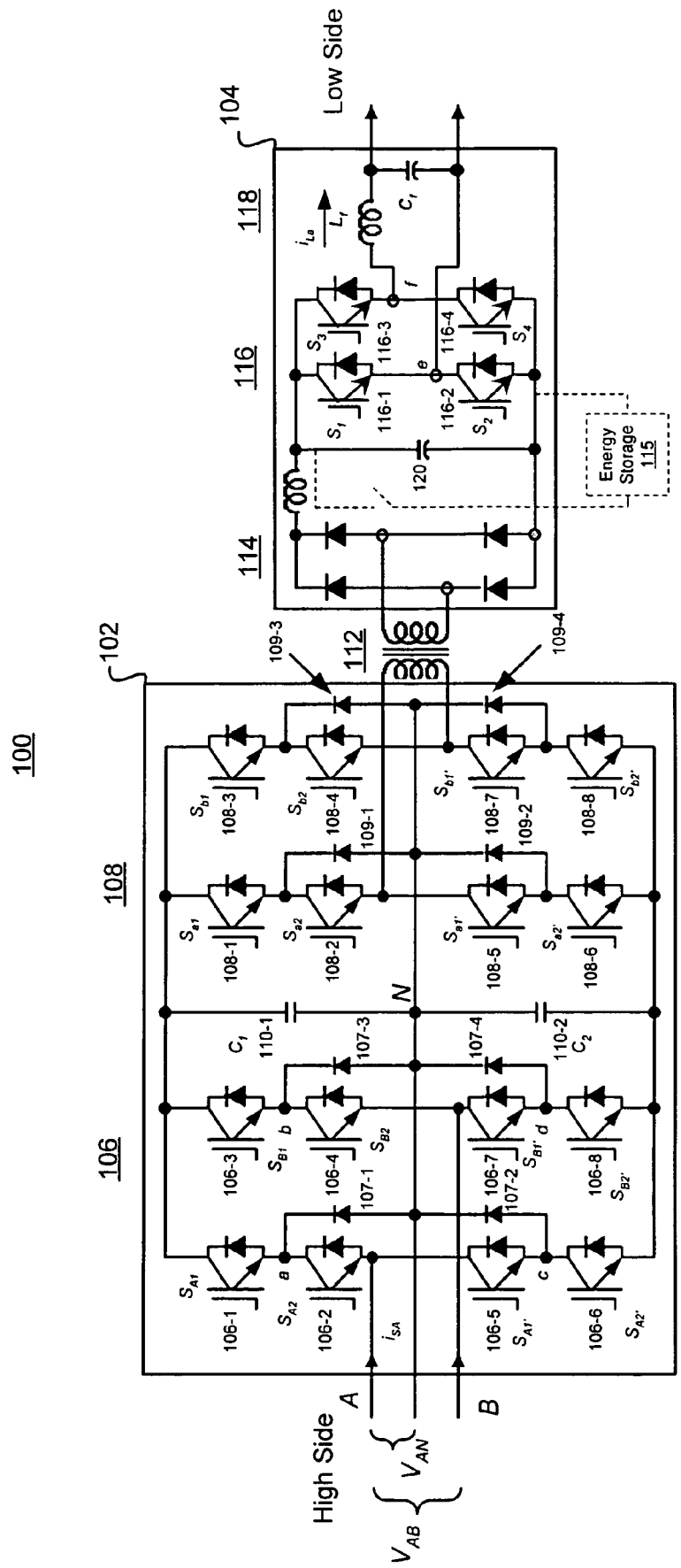
FIG. 1 is a circuit diagram of a multilevel converter-based, intelligent universal transformer, in accordance with some embodiments of the present invention.

FIG. 1 is a circuit diagram of a multilevel converter-based, intelligent universal transformer 100, in accordance with some embodiments of the present invention. The universal transformer 100 is an all-solid-state transformer comprising a single-phase, multilevel diode-clamped converter 102, a high frequency transformer 112 and a single-phase, DC-to-AC actively switched inverter 104. The input of the universal transformer 100 can be coupled to a distribution voltage level (e.g., 4160 Volts) and the output can be coupled to a low-voltage (e.g., 120 volts) consumer application. The multilevel converter 102 produces a high-frequency AC waveform which is fed into the high frequency transformer 112 for voltage level transformation from a first voltage level (e.g., 4160 Volts) to a second voltage level (e.g., 120 Volts). The transformed high-frequency AC waveform is then rectified and converted from DC to AC by the low-voltage inverter 104 to produce a clean, sinusoidal waveform suitable for use in low-voltage applications. Including the multilevel converter 102 in the front-end of the universal transformer 100 to convert the input AC waveform into a high-frequency AC waveform, allows the use of the high-frequency transformer 112 to provide isolation and voltage transformation. A high-frequency transformer 112 is typically several orders of magnitude smaller in size than a conventional low frequency transformer because it uses less magnetic materials.

Overview of Multilevel Diode-Clamped Converter

The multilevel converter 102 includes a set of back-to-back, interconnected voltage-source converters 106 and 108, which are coupled via a pair of series connected DC bus capacitors 110-1 ($C_1$) and 110-2 ($C_2$). The DC bus capacitors 110 can be any DC voltage source (e.g., capacitor bank, battery) capable of maintaining voltage for a sufficient period of time to compensate for a disturbance or interruption.

The converters 106 and 108 include semiconductor switches 106-1 through 106-8 and 108-1 through 108-8, respectively. The switches can include Gate-Turn-Off (GTO) Thyristors, Integrated Gate Bipolar Transistors (IGBTs), MOS Turn-off Thyristors (MTOs), Integrated-Gate Commutated Thyristors (IGCTs), Silicon Controlled Rectifiers (SCRs) or any other semiconductor devices that have a turn-off capability. If the universal transformer 100 is to be connected directly to a distribution voltage level, then the switches 106 and 108 can be high-voltage IGBTs. With improved punch-through (PT) technology, high-voltage IGBTs (HV-IGBTs) are available at 3.3 kV, 4.5 kV, and 6.5 kV. Note that the number of voltage levels of the multilevel converters 106 and 108 can be increased or decreased without departing from the scope of the present invention.

Also included in the converters 106 and 108 are clamping diodes 107 and 109, respectively. The diodes 107 and 109 are for clamping the switch voltage to half the level of the DC bus voltage, $V_{dc}$, as described more fully below with respect to FIG. 3.

In some embodiments, the converter 106 is configured as a multilevel, full-bridge converter that receives an AC voltage input and produces a DC voltage output. The full-bridge converter 106 has four pairs of switches 106 (e.g., $S_{A1}$–$S_{A2}$, $S_{B1}$–$S_{B2}$, $S_{A1'}$–$S_{A2'}$, $S_{B1'}$–$S_{B2'}$). The middle points a–d of the switch pairs are clamped to the middle point N (neutral point) of the split DC bus capacitors 110 or $V_{dc}/2$. In this configuration, each switch 106 blocks one capacitor 110 voltage level. For example, when both switches 106-1

($S_{A1}$) and 106-2 ($S_{A2}$) turn on, the voltage across nodes A and N is $V_{dc}/2$, i.e., $V_{AN}=V_{dc}/2$. When both switches 106-5 ($S_{A1'}$) and 106-6 ($S_{A2'}$) turn on, the voltage across nodes A and N is $-V_{dc}/2$, i.e., $V_{AN}=-V_{dc}/2$. When both switches 106-2 ($S_{A2}$) and 106-5 ($S_{A1'}$) turn on, the voltage across nodes A and N is 0, i.e., $V_{AN}=0$.

Figure 2A:
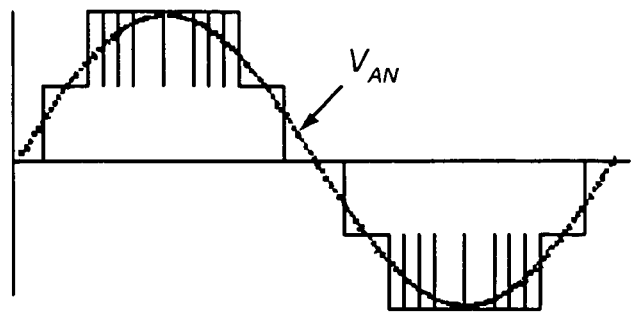
FIG. 2A is a graph illustrating a line-to-line voltage waveform of a three-level converter, in accordance with some embodiments of the present invention.

Note that the input voltage $V_{AN}$ is an AC waveform with three levels: $V_{dc}/2$, 0, $-V_{dc}/2$. Similarly, for phase-b, the voltage between B and N is also a three-level AC waveform. The line-to-line voltage $V_{AB}$ can have a total of five levels, as shown in FIG. 2A.

Figure 2B:
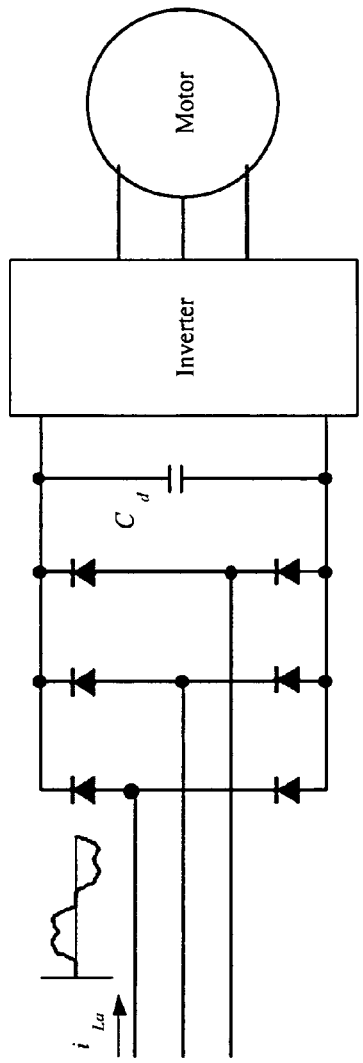
FIG. 2B is a circuit diagram illustrating a conventional three-phase nonlinear load, in accordance with some embodiments of the present invention.
Figure 2C:
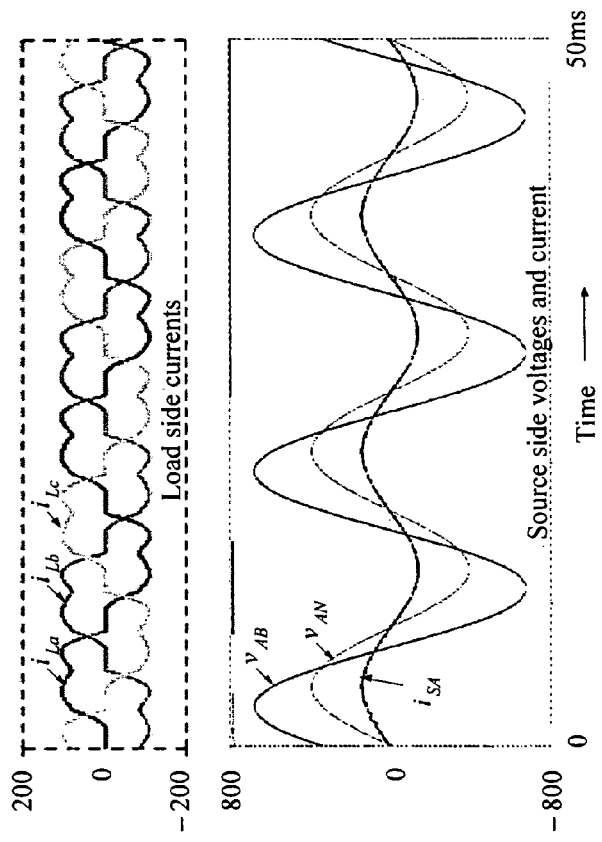
FIG. 2C is a graph illustrating a input current shaping using active, switched AC/DC conversion, in accordance with some embodiments of the present invention.
Figure 2D:
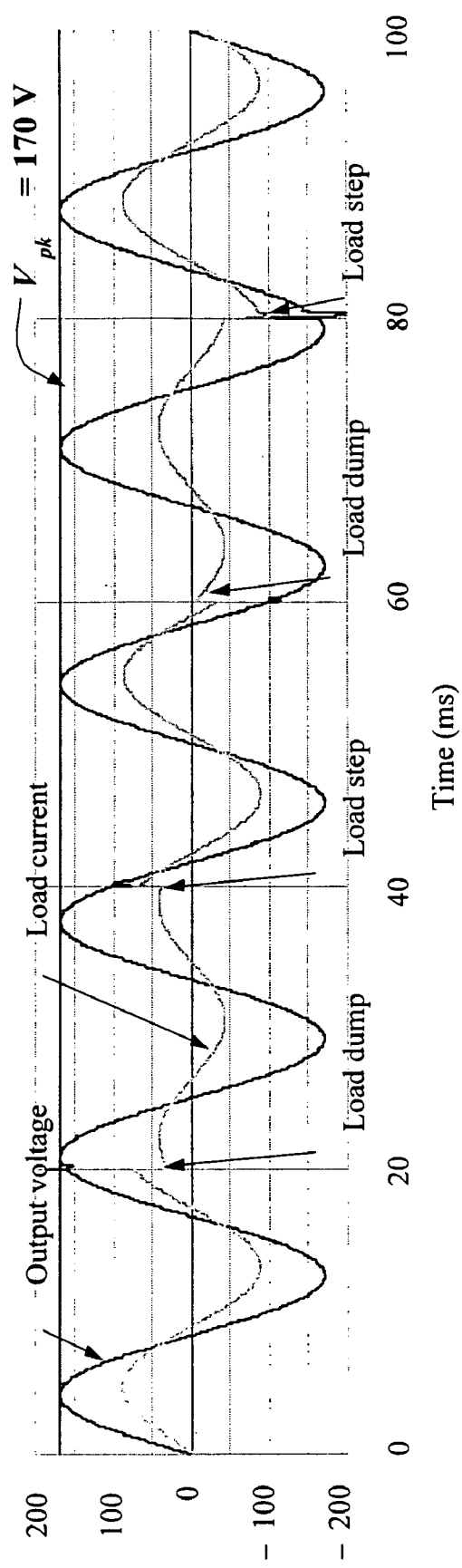
FIG. 2D is a graph illustrating a output voltage and current waveforms under load variations, in accordance with some embodiments of the present invention.

A nonlinear load (such as the adjustable speed drive shown in FIG. 2B) coupled to the output of the universal transformer 100 will produce a harmonic distorted load current, $i_{La}$, that tends to propagate back to the primary side of the high-frequency transformer 112. With proper switch control, however, the converter 102 shapes the input current, $i_{SA}$, to provide harmonic compensation. Switch control is described below with reference to FIG. 9. Even if the load current, $i_{La}$, is harmonic distorted the input current $i_{SA}$ is a clean, sinusoidal waveform in phase with the input source voltage, $V_{AN}$, as shown in FIG. 2C. Also, note also that the actively switched, low-voltage inverter circuit 116 maintains a constant output voltage even if the load current, $i_{La}$, steps up or dumps out, as shown in FIG. 2D.

If the universal transformer 100 is used in an application or system that requires outage compensation or short-term interruption protection, an energy storage device 118 can be coupled across the inputs of the inverter circuit 116 to ride-through these disturbances. When the input source voltage drops for a short period of time, the energy storage device 115 compensates for the deficit and maintains constant output voltage. The total period of compensation as a function of the amount of energy storage can be adapted as desired. The energy storage device 115 can include capacitor banks, ultra-capacitors, flywheels, batteries, or any other suitable storage media (or any combination thereof). In some embodiments, the energy storage device 115 can be switched into the inverter circuit 116 upon detection of a voltage sag and/or to provide outage compensation. In some embodiments, the duty cycle of the switches 106 can be controlled to ensure that the DC bus capacitors 110 maintain a constant voltage.

The universal transformer 100 provides the additional benefit of capacitor switch protection. In general, when using conventional transformers a power factor correction capacitor switching event produces a voltage transient to the nearby utility line. With the universal transformer 100, the voltage transient will not propagate to the secondary or load side because converters 106 and 108 can vary their conducting duty to accommodate changes in the input, such that the inverter 104 would not see a high-side voltage transient.

Figure 3:
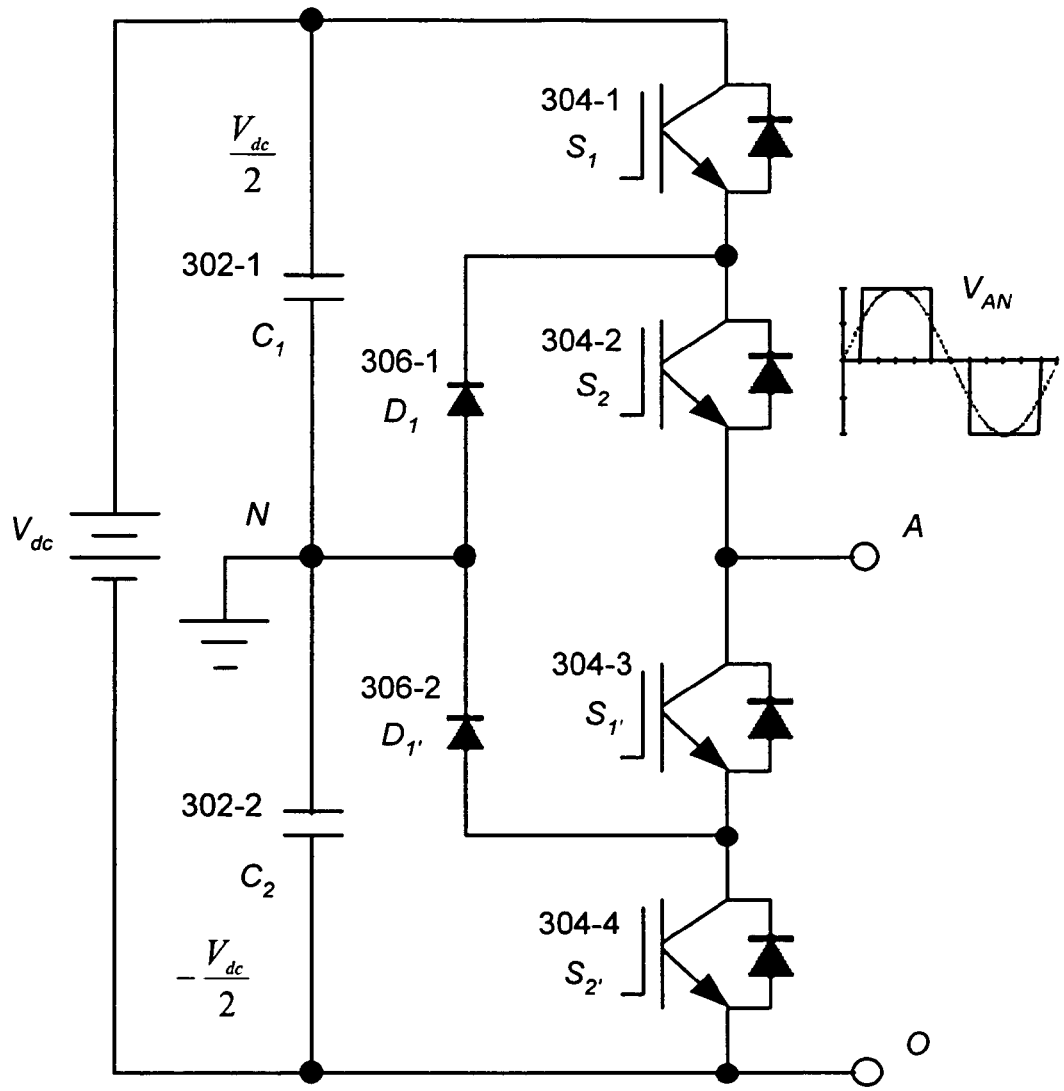
FIG. 3 is a circuit diagram of a basic three-level inverter, in accordance with some embodiments of the present invention.

FIG. 3 is a circuit of a basic three-level inverter 300, in accordance with some embodiments of the present invention. The three-level inverter 300 will be used to describe the operation of the first half (switches $S_{a1}$, $S_{a2}$, $S_{a1'}$, $S_{a2'}$) of the multilevel converter 108 in FIG. 1, which in some embodiments is configured as a three-level inverter.

Referring to the inverter 300, the DC bus voltage, $V_{dc}$, is split into three voltage levels by two series-connected bulk capacitors 302-1 ($C_1$) and 302-2 ($C_2$). The middle point of the capacitors 302, N, can be defined as a neutral point (e.g., ground). The output voltage, $V_{AN}$, has three states: $V_{dc}/2$, 0, and $-V_{dc}/2$. For voltage level $V_{dc}/2$, switches 304-1 ($S_1$) and 304-2 ($S_2$) are turned on. For voltage level $-V_{dc}/2$, switches 304-3 ($S_{1'}$) and 304-4 ($S_{2'}$) are turned on. For a 0 voltage level, 304-2 ($S_2$) and 304-3 ($S_{1'}$) are turned on.

Components that distinguish the inverter 300 from a conventional two-level inverter are clamping diodes 306-1 ($D_1$) and 306-2 ($D_1'$). The clamping diodes 306 clamp the switch voltage to half the level of the DC bus voltage, $V_{dc}$. When both switches 304-1 ($S_1$) and 304-2 ($S_2$) turn on, the voltage across nodes A and 0 is $V_{dc}$, i.e., $V_{AO}=V_{dc}$. In this case, diode 306-2 ($D_1'$) balances out the voltage shared between switches 304-3 ($S_{1'}$) and 304-4 ($S_{2'}$) with switch 304-3 ($S_{1'}$) blocking the voltage across capacitor 302-1 ($C_1$) and switch 304-4 ($S_{2'}$) blocking the voltage across 302-2 ($C_2$). Note that output voltage $V_{AN}$ is an AC waveform, and $V_{AO}$ is a DC waveform. The maximum voltage level for $V_{AO}$ is $V_{dc}$, and the maximum voltage level for $V_{AN}$ is $V_{dc}/2$. The difference between $V_{AN}$ and $V_{AO}$ is the voltage across $C_2$, which is $V_{dc}/2$. If an output is added between nodes A and 0, then the inverter 300 can be configured as a DC/DC converter having three output voltage levels: $V_{dc}$, $V_{dc}/2$, and 0, as described with respect to FIG. 10.

Overview of Low-Voltage Inverter

Referring again to FIG. 1, the low-voltage inverter 104 includes a diode bridge 114, a DC bus capacitor 120 and an actively switched inverter circuit 116. Under normal operation, an AC waveform is received from the secondary side of the high-frequency transformer 112 and rectified to a DC waveform by the diode bridge 114. The DC waveform charges the DC bus capacitor 120 to provide a stable voltage source for the switched inverter 116. The switched inverter circuit 116 includes semiconductor switches 116-1 through 116-4 ($S_1$–$S_4$) that can be rapidly switched (e.g., at approximately 20,000 to 40,000 Hz) to convert the DC voltage stored at the DC bus capacitor circuit 120 to a synthesized AC waveform. The DC bus capacitor 120 can be any DC voltage source (e.g., capacitor bank, battery) capable of maintaining voltage for a sufficient period of time to compensate for a disturbance or interruption. In some embodiments, the number of switches 116 and their rate of switching may be different from the exemplary values of the embodiment shown in FIG. 1.

The switched inverter 116 can have many different inverter circuit topology options. For example, the inverter 116 can be a half bridge-based inverter, which relies on capacitor-split sources and phase-leg switches to produce PWM (pulse width modulated) output. The inverter 116 can also be a cascaded inverter as described in U.S. Pat. No. 5,642,275, which is incorporated by reference herein in its entirety.

In some embodiments, a filter circuit 118 is coupled to the output of the inverter 116 (nodes e and f) for smoothing the output high frequency AC waveform. By adding the filter circuit 118 to the output, the AC output waveform is sinusoidal with substantially reduced ripple. In some embodiments, the filter circuit 118 includes an inductive element $L_f$ coupled to a shunt capacitance $C_f$ to form a low pass filter. The series inductor $L_f$ and shunt capacitor $C_f$ pair can also be split into two stages of series-inductor and shunt-capacitor pairs cascaded to form a higher order low pass filter. In other embodiments, the inductive element $L_f$ can be coupled directly to the utility line without the need of the shunt capacitor $C_f$. Note that other combinations of passive and/or active devices can be coupled to the switched inverter 116 for smoothing the output waveform using well-known filter design techniques.

The basic operation of the inverter 116 is to switch the $S_1$–$S_2$ and $S_3$–$S_4$ pairs in an alternating fashion so that the inverter 116 output voltage is an alternating chopped DC voltage. The filter 118 smoothes the chopped DC voltage into a clean, sinusoidal waveform. The switches 116 can be controlled by an external controller using either analog or digital control signals in a manner commonly known to one of ordinary skill in the art. For example, the states of switches 116 can be controlled using pulse-width modulation (PWM) techniques. In PWM, the width of pulses in a pulse train is modified in direct proportion to a small control voltage. By using a control waveform of a desired frequency as a control voltage, it is possible to produce a waveform whose average voltage varies sinusoidally in a manner suitable for driving the switches 116. An embodiment of a pulse-width modulation inverter control circuit is described below with respect to FIG. 9.

If the universal transformer 100 is used in an application or system that requires outage compensation or short-term interruption protection, an energy storage device (not shown) can be coupled across the inputs of the low-voltage inverter 104 (e.g., in parallel with the DC Bus capacitor 120) to mitigate disturbances. When the input source voltage drops for a short period of time, the energy storage device compensates for the deficit and maintains constant output voltage. The total period of compensation as a function of the amount of energy storage can be adapted as desired. The energy storage device can include capacitor banks, ultra-capacitors, low-speed flywheels, batteries, or any other suitable storage media (or any combination thereof). In some embodiments, the energy storage device can be switched into the universal transformer 100 upon detection of a voltage sag and/or to provide outage compensation.

Other Embodiments of the Multilevel Converter

Figure 4:
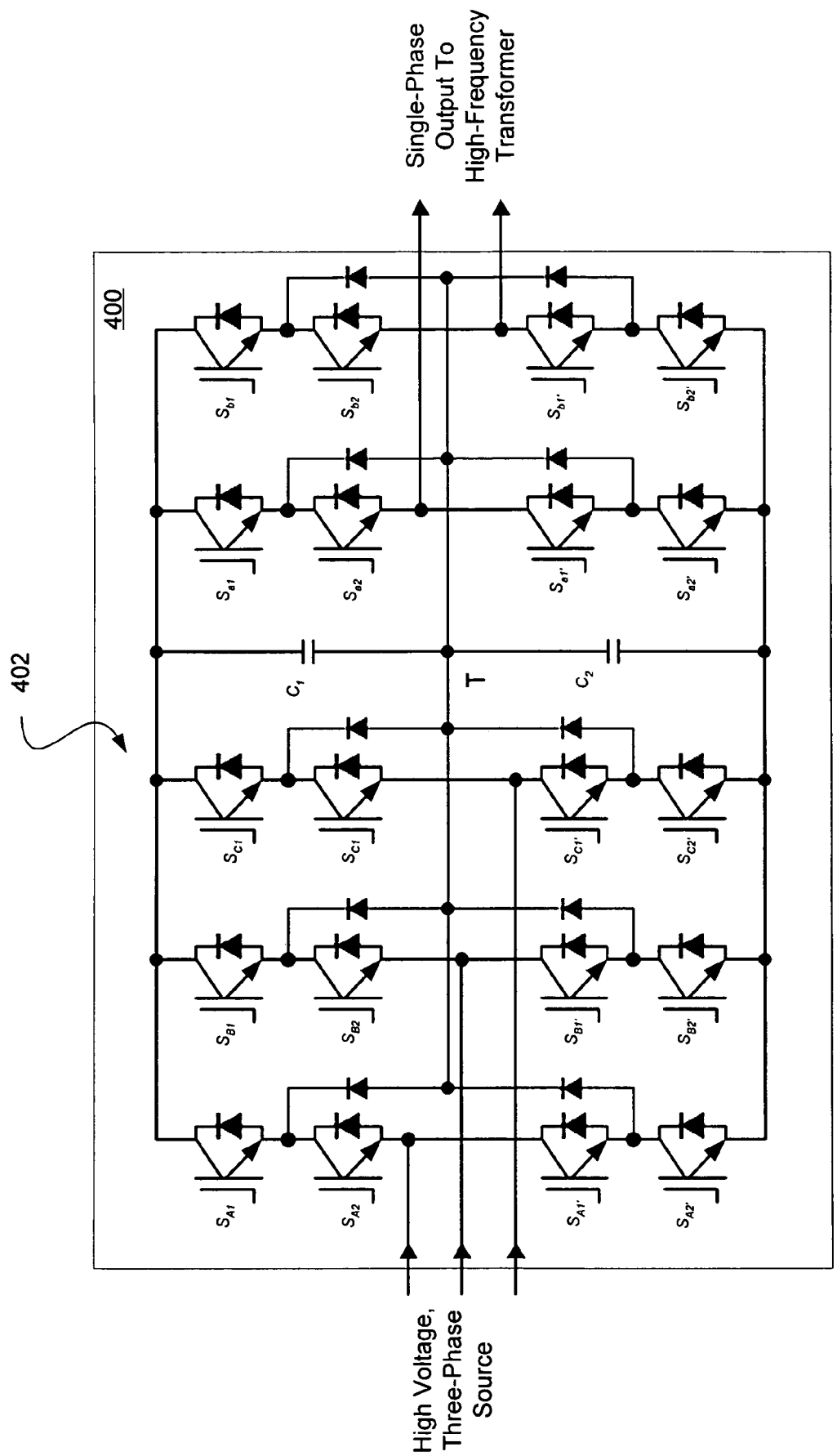
FIG. 4 is a circuit diagram of a three-phase multilevel converter adapted to be a front-end of the universal transformer in FIG. 1, in accordance with some embodiments of the present invention.

FIG. 4 is a circuit diagram of a three-phase multilevel converter 400, in accordance with some embodiments of the present invention. The multilevel converter 102 in FIG. 1 can be replaced with the three-phase multilevel converter 400.

In this embodiment, an additional branch of switches 402 ($S_{C1}$, $S_{C2}$, $S_{C1'}$, and $SC_{2'}$) is added to the converter 400, such that the input of the converter 400 can be directly tied to a three-phase distribution source. The three-phase converter 400 allows power conversion directly from the three-phase source to a single-phase output, while reducing unbalance loading among the three phases. The basic switch control of the converter 400 is similar to the multilevel converter 102, except for the additional branch of switches 402, which must be switched as well. Switch control for a three-phase input is further described with respect to FIG. 9.

Figure 5:
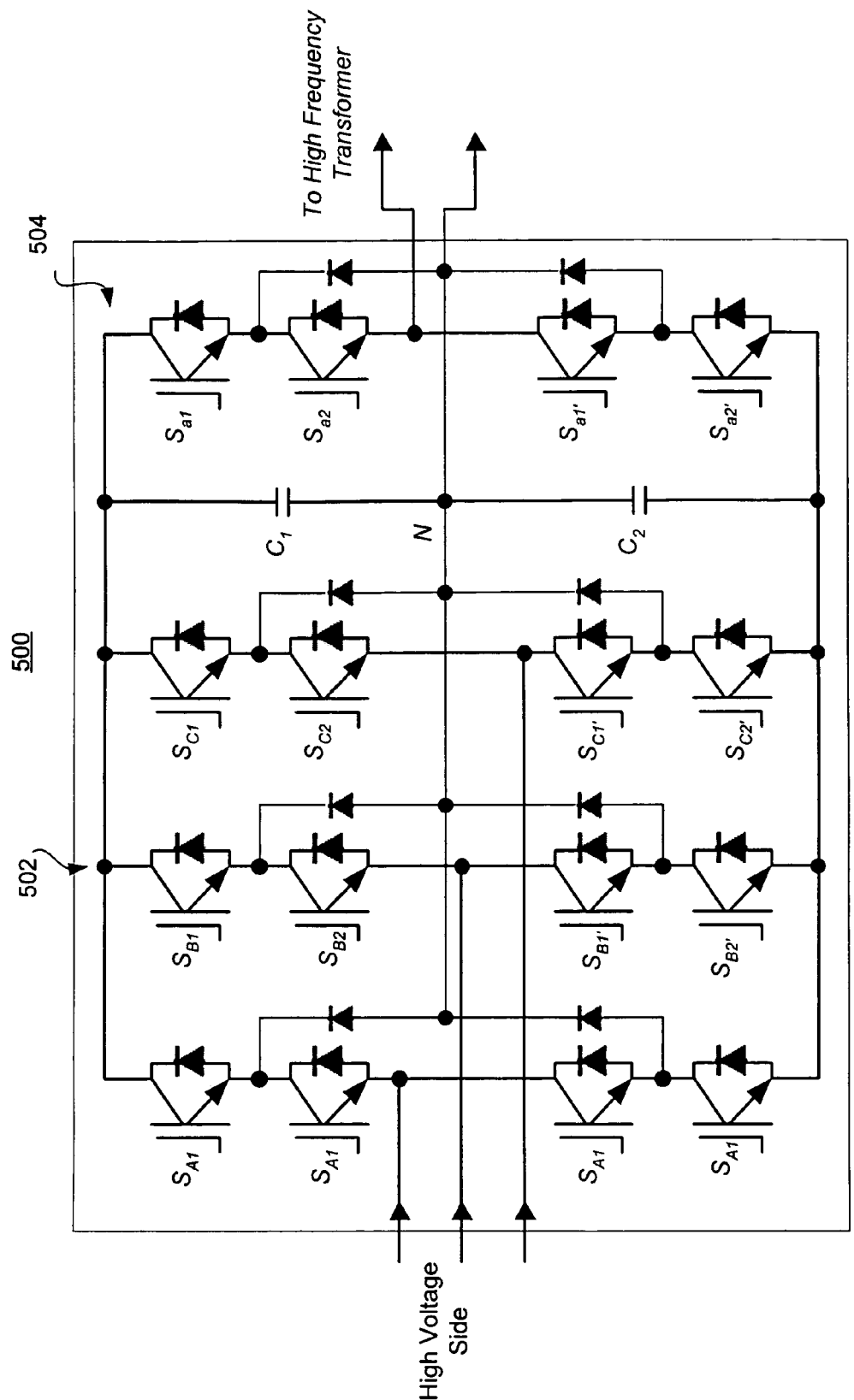
FIG. 5 is a circuit diagram of the front-end three-phase multilevel converter in FIG. 4 but including a half-bridge inverter for high-frequency AC conversion, in accordance with some embodiments of the present invention.

FIG. 5 is a circuit diagram of a three-phase multilevel converter 500 but including a front-end converter 502 coupled to a half-bridge inverter 504 for high-frequency AC conversion, in accordance with some embodiments of the present invention. The converter 500 not only reduces the number of devices and components, but also reduces the transformer insulation requirement because its output voltage is only half that produced by a full-bridge inverter. If the voltage source is tied from line to neutral, it is possible to further reduce the parts count by connecting the source neutral to the middle point N of the capacitor stack ($C_1$, $C_2$). This circuit change reconfigures the front-end converter 502 into a half-bridge converter.

Figure 6:
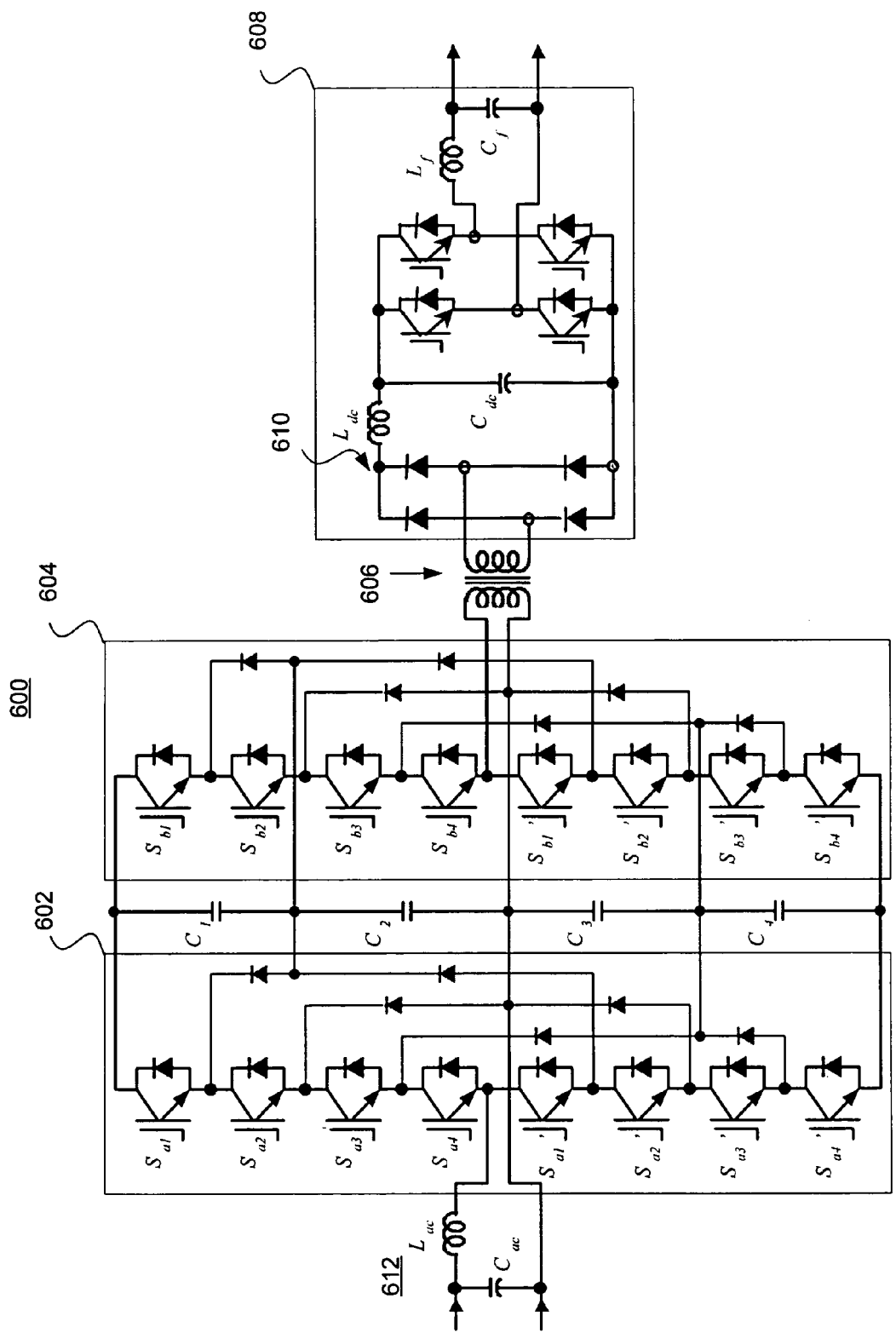
FIG. 6 is a circuit diagram of a multilevel solid state transformer circuit with a half-bridge front-end multilevel converter, a half-bridge multilevel inverter, a high-frequency transformer and a low voltage inverter, in accordance with some embodiments of the present invention.

FIG. 6 is a circuit diagram of a multilevel solid state transformer circuit 600 with a half-bridge front-end multilevel converter 602, a half-bridge multilevel inverter 604, a high-frequency transformer 606 and a low voltage inverter 608, in accordance with some embodiments of the present invention. In the circuit 600 as shown, the low voltage inverter includes a low-voltage side diode-bridge 610. If the low-voltage side diode-bridge 610 is replaced with an IGBT-based full-bridge converter, then the transformer 600 is symmetrical with the front-end multilevel converter 602 at the high-voltage side and a full-bridge converter at the low-voltage side, thus enabling bi-directional power flow. In some embodiments a filter circuit 612 is coupled to the input of the front-end multilevel converter 602 to smooth the input AC waveform prior to conversion. The front-end multilevel converter 602 is a five-level, diode-clamped converter, which includes four DC bus capacitors. The operation of the front-end multilevel converter 602 is further described with respect to FIG. 7.

Figure 7:
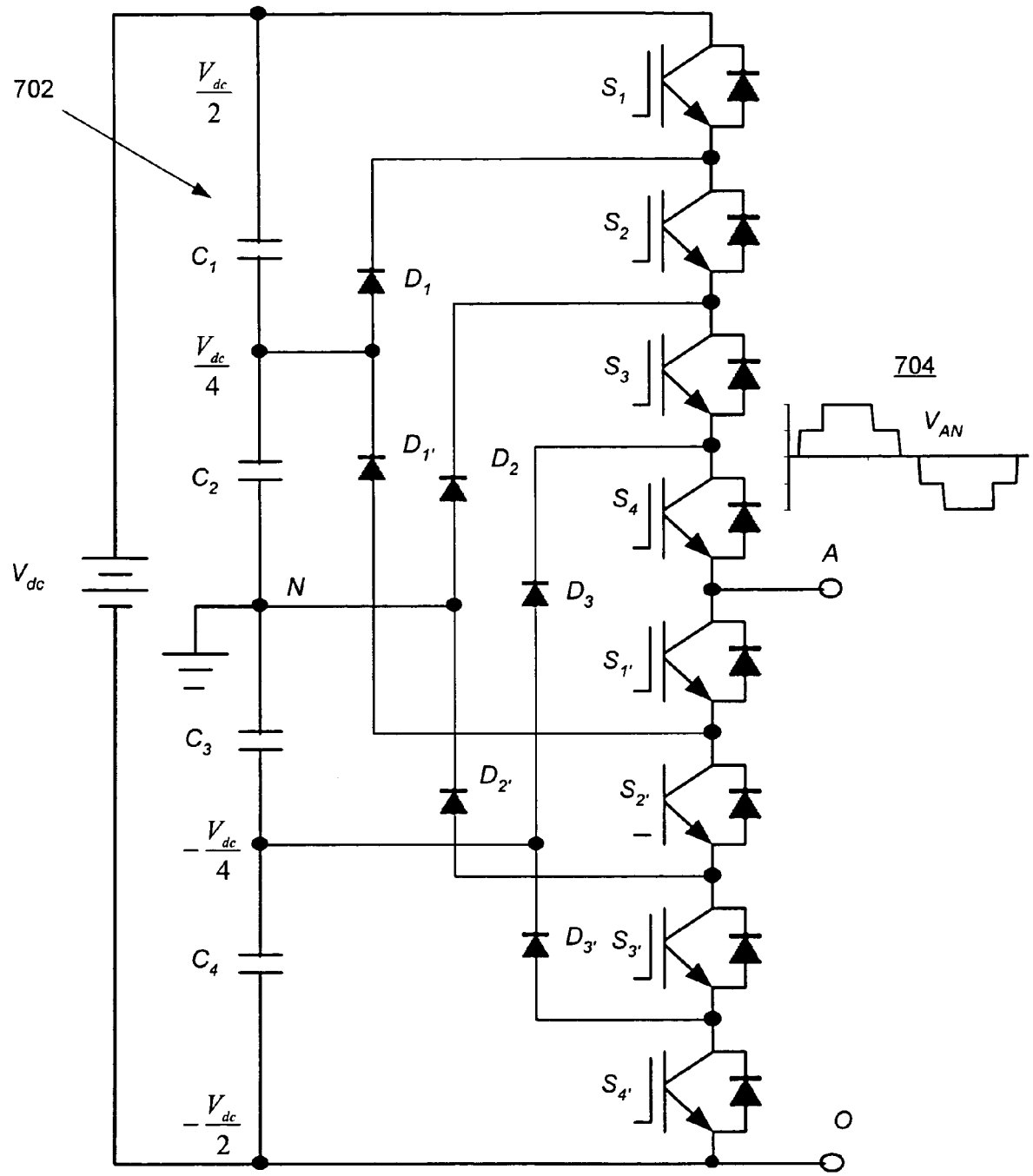
FIG. 7 is a circuit diagram of a five level inverter circuit, in accordance with some embodiments of the present invention.

FIG. 7 is a circuit diagram of a five-level, diode-clamped converter 700 in accordance with some embodiments of the present invention. The converter 700 includes a DC bus 702 comprising four DC bus capacitors, $C_1$, $C_2$, $C_3$, and $C_4$. For the DC bus voltage, $V_{dc}$, the voltage across each capacitor is $V_{dc}/4$, and the voltage stress on each device will be limited to one capacitor voltage level, $V_{dc}/4$, by clamping diodes $D_1$, $D_1'$, $D_2$, $D_2'$, $D_3$ and $D_3'$. To explain how the staircase voltage 704 is synthesized, the neutral point, N, is considered as the output phase voltage reference point. There are five switch combinations to synthesize five level voltages across A and N.

For voltage level $V_{AN}=V_{dc}/2$, turn on all upper switches, $S_1$ through $S_4$. For voltage level $V_{AN}=V_{dc}/4$, turn on three upper switches, $S_2$ through $S_4$ and one lower switch, $S_1'$. For voltage level $V_{AN}=0$, turn on two upper switches, $S_3$ and $S_4$, and two lower switches $S_1'$ and $S_2'$. For voltage level $V_{AN}=-V_{dc}/4$, turn on one upper switch, $S_4$, and three lower switches, $S_1'$ through $S_3'$. For voltage level $V_{AN}=-V_{dc}/2$, turn on all lower switches, $S_1'$ through $S_4'$. Four complementary switch pairs exist in each phase. The complementary switch pair is defined such that turning on one of the switches will exclude the other from being turned on. In this example, the four complementary pairs are ($S_1$, $S_1'$), ($S_2$, $S_2'$), ($S_3$, $S_3'$), and ($S_4$, $S_4'$). Although each active switching device is only required to block a voltage level of $V_{dc}/(m-1)$, the clamping diodes should have different voltage ratings for reverse voltage blocking, where m represents the number of distinct voltage levels produced by the converter. Note that m=5 for a five level converter, so the voltage level stress for each switch is $V_{dc}/4$. Likewise, m=3 for a three-level converter, so the voltage level stress for each switch is $V_{dc}/2$.

When the lower switches $S_2'$-$S_4'$ are turned on, $D_1'$ needs to block three capacitor voltages, or $3V_{dc}/4$. Similarly, $D_2$ and $D_2'$ need to block $2V_{dc}/4$, and $D_3$ needs to block $3V_{dc}/4$. Assuming that each blocking diode voltage rating is the same as the active switch voltage rating, the number of diodes required for each phase will be $(m-1)\times(m-2)$.

Figure 8:
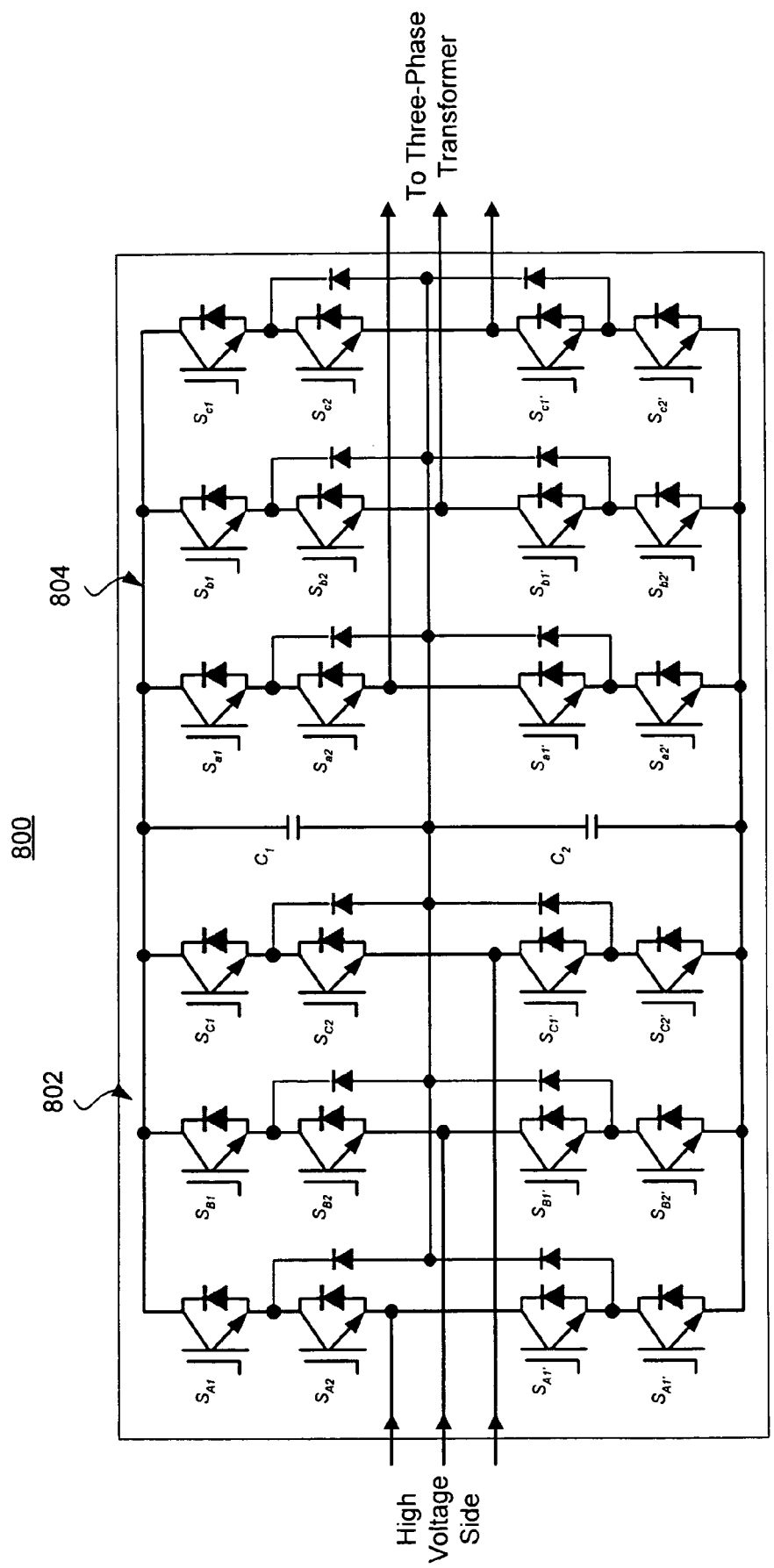
FIG. 8 is a circuit diagram of a three-phase front-end multilevel converter and three-phase multilevel inverter for high power applications, in accordance with some embodiments of the present invention.

In practice the off-the-shelf high-frequency magnetic materials used to construct the high-frequency transformer used in the described embodiments may be limited in size and power. Such limitations, however, may not be sufficient for certain power applications. The largest off-the-shelf size ferrite EE core with 80 mm or 90 mm length may be designed for up to 20 kW depending on the switching frequency. Although it is possible to have custom-made magnetic cores for higher power applications, the cost to make such cores may be prohibitively expensive unless there is a large quantity order. FIG. 8 shows a possible option with a three-phase multilevel inverter to triple the power level.

FIG. 8 is a circuit diagram of a front-end multilevel converter 800, in accordance with some embodiments of the present invention. The converter 800 includes a three-phase multilevel converter 802 and a three-phase multilevel inverter 804. Note the output of the three-phase multilevel inverter 804 can be coupled to a three-phase high-frequency transformer or three single-phase transformers (not shown). A three-phase high-frequency transformer typically has one core with three sets of windings. However, the core can be separated into three sets with their own independent windings. Further, the three-phase high-frequency transformer windings can be connected in a Y or Δ configuration for either the primary or secondary sides of the transformer.

Figure 9:
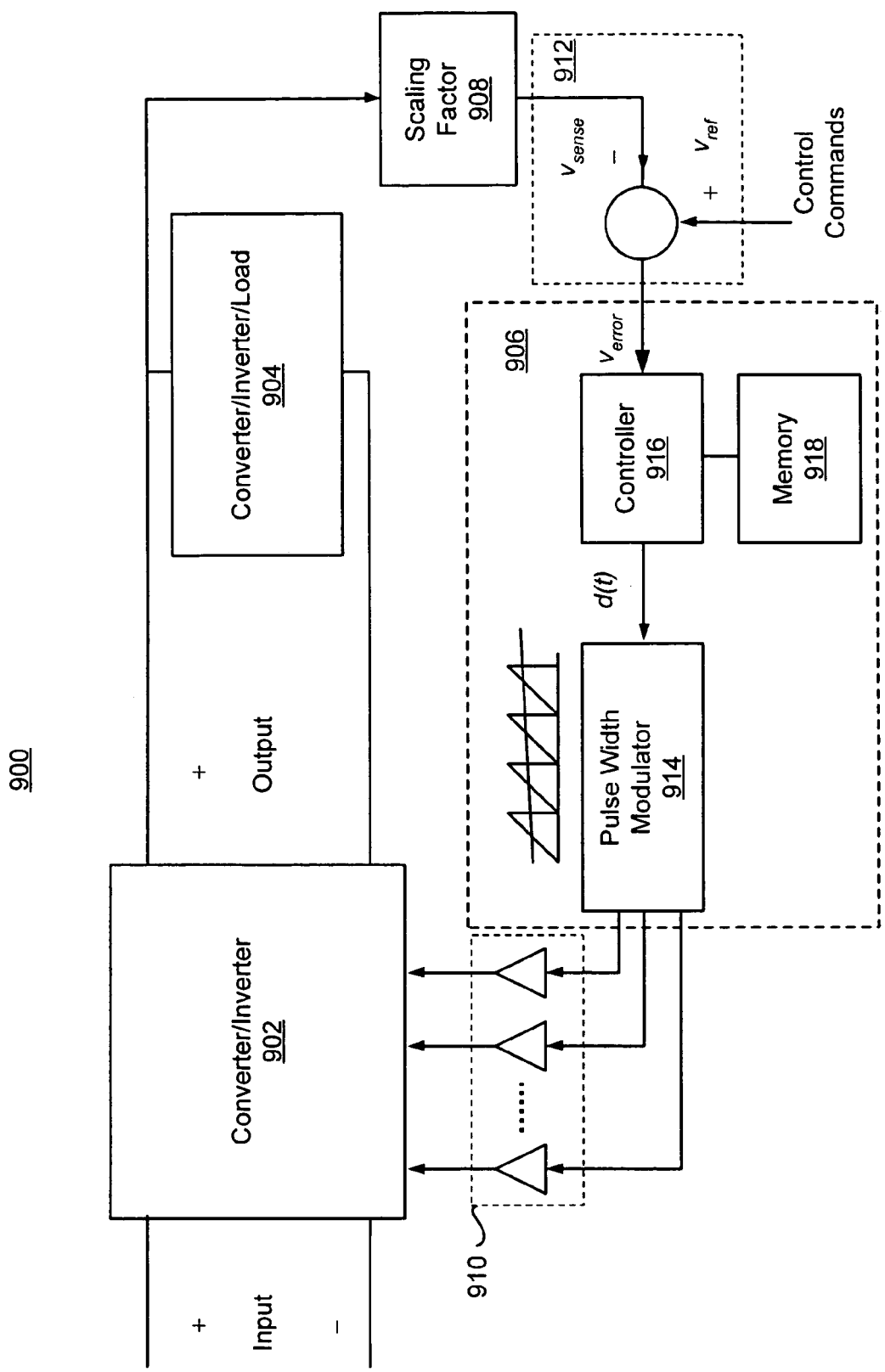
FIG. 9 is a block diagram of a converter/inverter control system, in accordance with some embodiments of the present invention.

FIG. 9 is a block diagram of a converter/inverter control system 900 for controlling a converter or inverter 902, in accordance with some embodiments of the present invention. The feedback control system 900 includes a processor 906 (e.g., microcomputer, digital signal processor), a scaling factor circuit 908, a set of gate drivers 910 and a command interface 912. The processor further includes a pulse width modulator 914, a controller 916 and memory 918 (e.g., DRAM, SRAM, and/or Flash Memory). The scaling factor circuit 908 and the gate drivers 910 isolate control signals from the power.

In operation, the processor 906 compares a command voltage $V_{ref}$ and a scaled feedback output signal $V_{sense}$ to determine an error signal $V_{error}$. The feedback signal, $V_{sense}$, is taken from the output of the converter/inverter 902. The error signal $V_{error}$ is received by the controller 916, which applies a proportional (P), proportional-integral (PI), or proportional-integral-differentiator (PID) function to the error signal so as to generate a smooth duty cycle signal, d(t). Note that in a typical application, either a load (e.g., adjustable speed drive) or another converter/inverter 904 is coupled to the output of the converter/inverter 902.

The duty cycle of each switch is computed by the processor 906 using one or more computer programs or gate pattern logic stored in memory 918. The resulting duty cycle signal, d(t), is then sent to the pulse width modulator 914 (PWM), which generally includes a set of voltage comparators. In some embodiments, one comparator is used for each pair of switches. For example, the switch pair $S_1$–$S_2$ in the actively switched inverter 104 (FIG. 1) can be controlled by a first comparator and the switch pair $S_3$–$S_4$ can be controlled by a second comparator. The PWM signals are then fed into the gate drivers 910 to turn the switches in the converter/inverter 902 on or off. The number of switches in the converter/inverter 902 depends on how many voltage levels and phases are to be controlled.

The control voltages d(t) (and therefore the output pulse width) can be varied to achieve different frequencies and voltage levels in any desired manner. For example, the processor 906 can implement various acceleration and deceleration ramps, current limits, and voltage-versus-frequency curves by changing variables (e.g., via the command interface 912) in control programs or gate pattern logic stored in memory 918.

If the duty cycle d(t) is greater than the voltage level of a reference waveform (e.g., a triangular waveform) at any given time t, then the PWM circuit 914 will turn on the upper switches (e.g., switches $S_1$ and $S_2$) of inverter 104 and turn off the lower switches (e.g., switches $S_3$ and $S_4$) of the inverter 104. For a three-phase PWM inverter embodiment (e.g., the embodiment shown in FIG. 8), three single-phase control circuits can be used with control voltages comprising sinusoidal waveforms shifted by 120 degrees between phases using techniques well-known in the art.

In some embodiments, the control system 900 includes a detection circuit configured to detect when the input power source has a missing phase or is running under a single-phase condition and to generate control signals to be used by the command interface 912 to shut off the switches in one or more phase-legs of the universal transformer.

Figure 10:
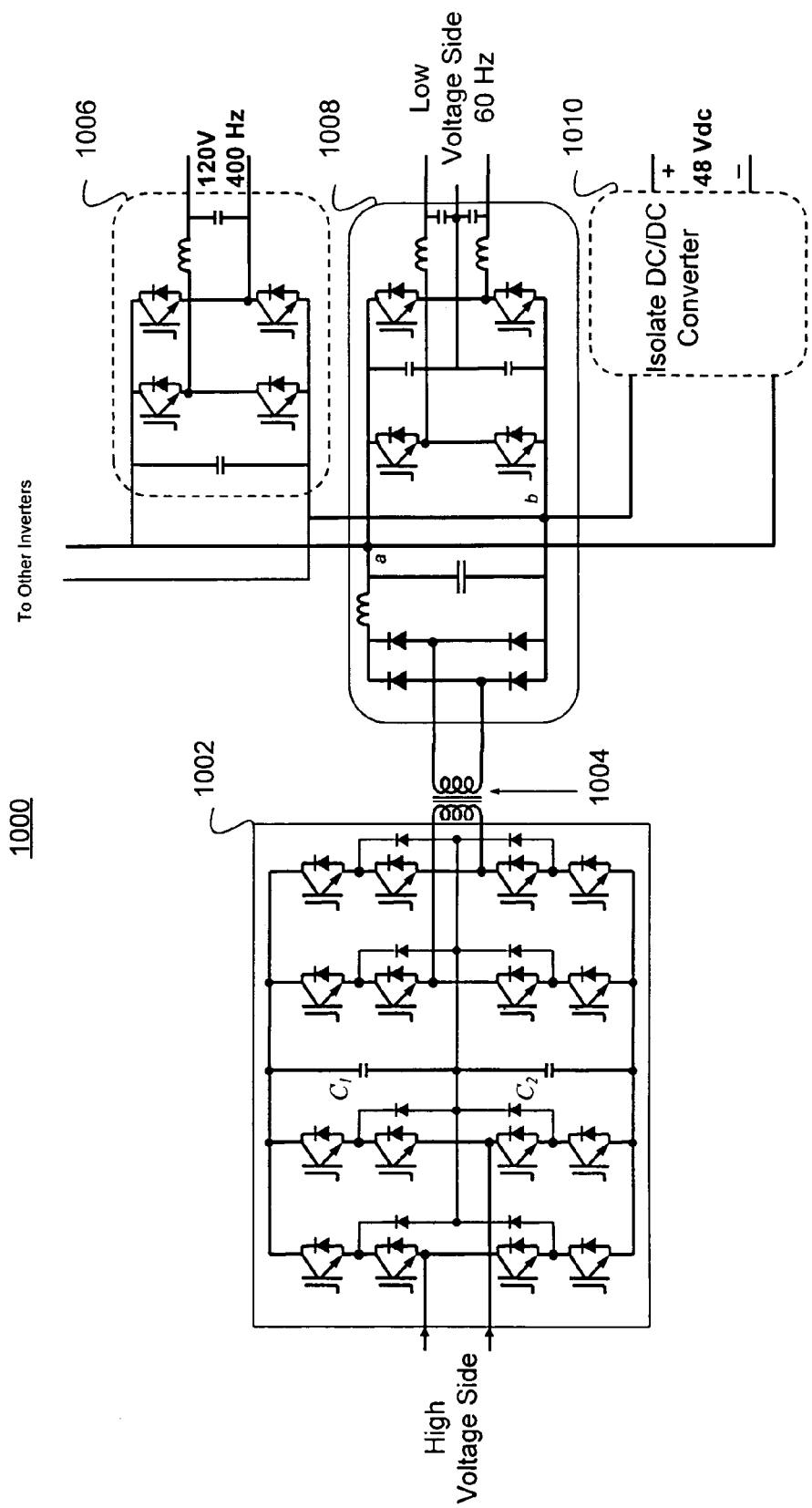
FIG. 10 is a block diagram of a universal transformer that has been modified to provide a DC output and a variable frequency output, in accordance with one embodiment of the present invention.

FIG. 10 is a block diagram of a universal transformer 1000 that has been modified to provide a DC output and a variable frequency output, in accordance with one embodiment of the present invention. The universal transformer 1000 includes a multilevel converter 1002 coupled to a low-voltage inverter circuit 1008 (e.g., 120 Volts @ 60 Hz) via a high-frequency transformer 1004. The universal transformer 1000 is the same as the universal transformer 100 shown in FIG. 1, except for the addition of a second low-voltage inverter circuit 1006, which provides a 400 Hz output. The second inverter 1006 takes it input from across the DC bus (nodes a and b). Note that other inverter circuits having different output frequencies (e.g., 50 Hz) can be added to the inverter 1008 in a similar manner to provide a variable frequency output.

Additionally, the universal transformer 1000 can be modified to provide one or more DC output levels by coupling a DC/DC converter 1010 across the DC bus of inverter 1008 (nodes a and b). In some embodiments, the DC/DC converter 1010 can be a multilevel DC/DC converter for providing a variety of different DC voltage levels.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A power conversion device, comprising:
   a multilevel converter configurable to convert an input waveform having a first frequency into a second waveform having a second frequency, wherein the second frequency is higher than the first frequency;
   a transformer coupled to the multilevel converter and configurable to transform the second waveform from a first voltage level to a second voltage level, wherein the first voltage level is higher than the second voltage level; and
   a switched inverter circuit coupled to the transformer and configurable to convert the transformed, second waveform into a third waveform for use with a power application.

2. The device of claim 1, further comprising:
   a filter circuit coupled to the switched inverter circuit for smoothing the third waveform into a substantially clean, sinusoidal waveform.

3. The device of claim 1, wherein the multilevel converter is a diode-clamped multilevel converter.

4. The device of claim 1, wherein the multilevel converter further comprises:
   a first set of switches configurable to provide a multilevel, full-bridge converter; and
   a second set of switches coupled to the first set of switches and configurable to provide a multilevel, full-bridge inverter.

5. The device of claim 4, wherein the second set of switches are configurable to provide a multilevel, half-bridge inverter.

6. The device of claim 4, wherein the first set of switches is coupled to the second set of switches by a Direct Current (DC) link.

7. The device of claim 6, wherein the DC link includes two or more DC voltage storage devices.

8. The device of claim 1, wherein the switched inverter circuit further comprises:
 a diode bridge for rectifying the second waveform into at least one Direct Current (DC) voltage level;
 a DC storage device coupled to the diode bridge for maintaining the DC voltage level; and
 a set of switches configurable for synthesizing the DC voltage level into the third waveform.

9. The device of claim 1, wherein the multilevel converter is configurable to convert three-phase input waveforms.

10. The device of claim 1, wherein the multilevel converter includes a plurality of high-voltage Integrated Gate Bipolar Transistors (IGBTs) for directly coupling the multilevel converter to a distribution voltage level.

11. The device of claim 1, wherein the multilevel converter includes a Direct Current (DC) bus comprising multiple storage devices.

12. The device of claim 11, wherein the DC bus is adapted to be coupled to a DC/DC converter circuit for providing one or more DC output voltage levels.

13. The device of claim 11, wherein the DC bus is adapted to be coupled to one or more additional switched inverter circuits for providing a variable frequency output.

14. A method of converting power, comprising:
 converting an input waveform having a first frequency into a second waveform having a second frequency, wherein the second frequency is higher than the first frequency;
 transforming the second waveform from a first voltage level to a second voltage level, wherein the first voltage level is higher than the second voltage level; and
 converting the transformed, second waveform into a third waveform for use with a power application.

15. The method of claim 14, further comprising:
 smoothing the third waveform into a substantially clean, sinusoidal waveform.

16. The method of claim 14, wherein the step of converting the transformer, second waveform into a third waveform further comprises:
 rectifying the second waveform into at least one Direct Current (DC) voltage level;
 maintaining the DC voltage level; and
 synthesizing the DC voltage level into the third waveform.

* * * * *